2 Sheets—Sheet 1.
*Featherstone & Engmann,*
*Circular Saw-Mill.*
N°. 20,870. Patented July 13, 1858.
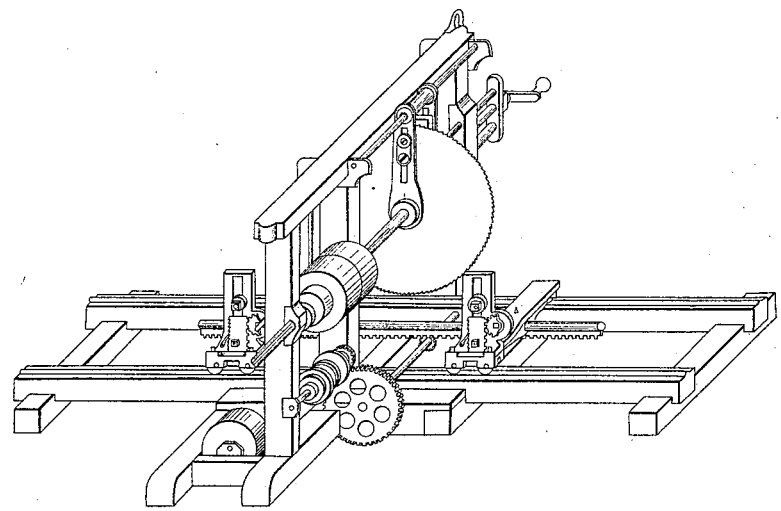
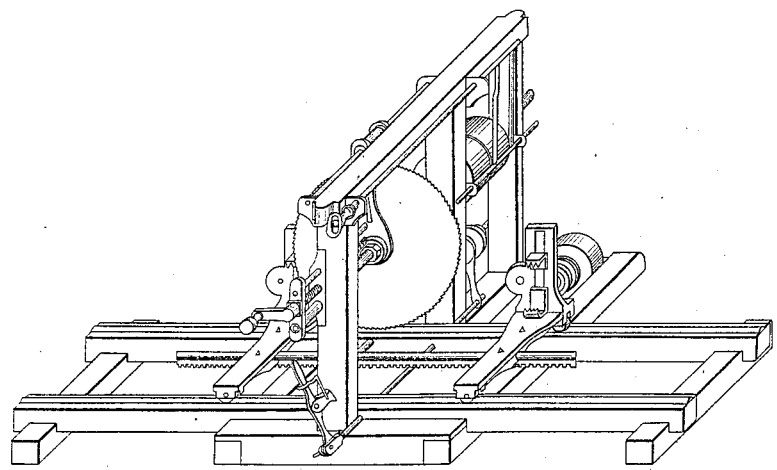
Inventors:
J. Featherstone
P. Engmann

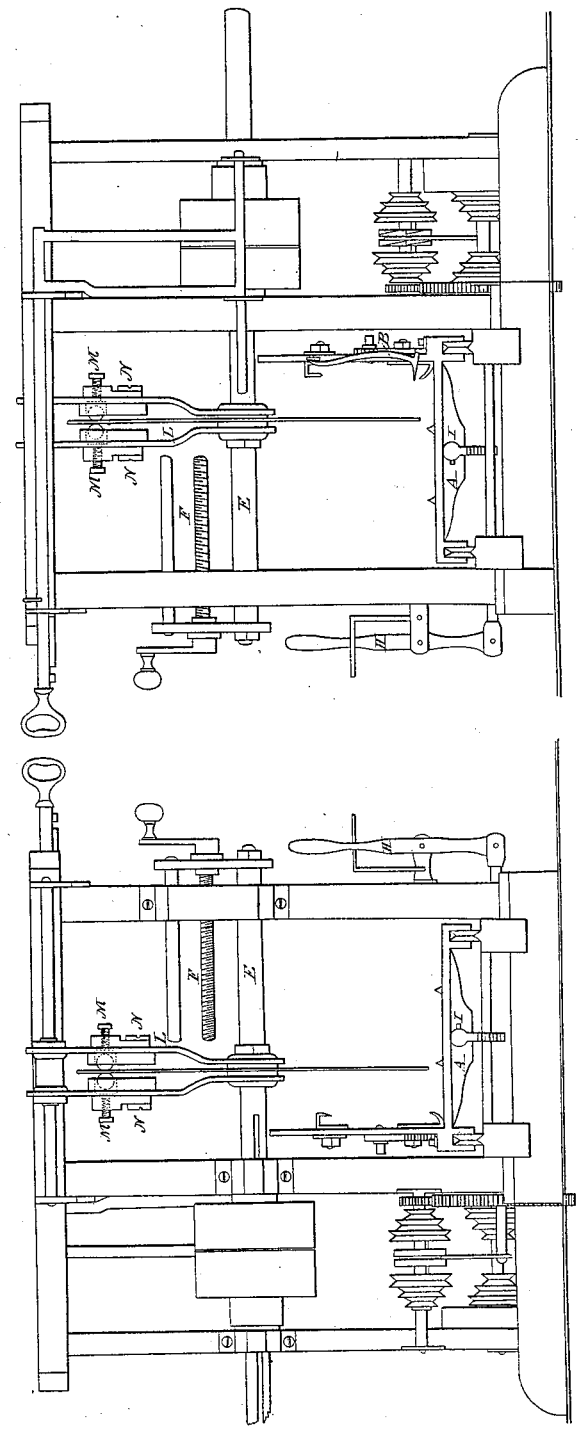

UNITED STATES PATENT OFFICE.

H. FEATHERSTONE AND P. ENGMANN, OF NEW ORLEANS, LOUISIANA.

SAWING-MACHINE.

Specification of Letters Patent No. 20,870, dated July 13, 1858.

*To all whom it may concern:*

Be it known that we, HENRY FEATHERSTONE and PETER ENGMANN, of New Orleans, State of Louisiana, have invented a new and useful Improvement in Circular-Saw Mills; and we do believe and hereby declare that the following is a full and exact description thereof, reference being had to the accompanying drawings, with letters of reference marked thereon.

The nature of our invention, is the lateral movement of the saw, which enables us to saw, with a forward and backward motion; all the movements, are under the immediate control of the sawyer, besides it occupies less space, in doing away, with the formerly used cumbrous carriage and is more portable.

We will now proceed to describe the construction and operation.

The round log is placed on the two trucks, marked A, on the drawings, and fastened by the points at the bottom of the truck, on top, the log, is fastened with the dogs, attached to the truck, by means of oscillating eye bolts, marked B. When squared, the log is placed, between the upper and lower dogs, attached to the truck. The upper one, which is seldom moved, can be moved and fastened, simply by a nut, as shown on the drawings, and the lower dog is raised by the sector and rack, marked D, to any required height, so as to bring the log, as near the center of the saw, as possible. The main shaft, marked E, on which the saw is fastened, is moved by the screw, marked F, in a lateral direction, according to the size of lumber cut. When the cut, is run out forward, the sawyer has only to throw his clutch, out of gear, set his saw, by means of screw, F, to the next size of lumber he wishes to cut and give it a backing motion, by means of lever H. Two or more trucks, can be used. The back bone rack, that connects the trucks, by means of a gib head key and marked, I, can be lengthened, to any required length if lumber of unusual length, has to be cut, by adding another length of rack to it, by means of the aforesaid keys or clamp, marked, K. In the suspension guide, marked L, that connects the saw shaft with the upper rod, is inserted square cups, with chilled iron, or other antifriction metal balls, which can be set to any point by the set screw, marked M, besides it can be moved up and down, in the slot, by means of screw, marked N.

What we claim, as our invention, and desire to secure by Letters Patent, is,—

1. The lateral movement of the saw, as heretofore represented.

2. The suspension guides, with their cups and balls, as applied here, to guide the saw, and its connections with the saw shaft.

3. The back bone rack, connecting the trucks.

4. The truck and dog, with their movement, by means of the sector and rack, all as shown more fully on the drawings.

New Orleans, April, the 18th 1858.

H. FEATHERSTONE.
P. ENGMANN.

Witnesses:
ROBERT McCULLOCH,
A. A. PRAY.